(12) United States Patent
Barrus et al.

(10) Patent No.: US 7,002,604 B1
(45) Date of Patent: Feb. 21, 2006

(54) SCREEN ROTATION

(75) Inventors: Frank E. Barrus, New Ipswich, NH (US); Lawrence R. Rau, Dublin, NH (US); Craig F. Newell, Lowell, MA (US)

(73) Assignee: SavaJe Technologies, Inc., Chelmsford, MA (US)

( * ) Notice: Subject to any disclaimer, the term of this patent is extended or adjusted under 35 U.S.C. 154(b) by 36 days.

(21) Appl. No.: 10/287,871

(22) Filed: Nov. 4, 2002

(51) Int. Cl.
  *G09G 5/00* (2006.01)
  *G09G 5/36* (2006.01)
  *G06K 9/31* (2006.01)
  *G06T 1/60* (2006.01)

(52) U.S. Cl. .................... 345/649; 345/645; 345/652; 345/672; 345/530; 345/553; 382/216; 382/295; 382/296; 382/297

(58) Field of Classification Search ............ 345/645, 345/650, 653, 654, 655, 657–659, 649, 643, 345/652, 656, 672, 676–682, 686, 530, 531–538, 345/547–548, 552–553; 382/216, 295, 296, 382/297; G09G 5/00, 5/36; G06T 1/60; G06K 9/32
See application file for complete search history.

(56) References Cited

U.S. PATENT DOCUMENTS

| 5,661,632 | A |   | 8/1997  | Register |
| 5,973,664 | A | * | 10/1999 | Badger ........................ 345/659 |
| 6,239,787 | B1 | * | 5/2001  | Sugaya ........................ 345/169 |
| 6,400,851 | B1 |   | 6/2002  | Shih |
| 6,567,101 | B1 | * | 5/2003  | Thomas ...................... 345/649 |
| 6,686,909 | B1 | * | 2/2004  | Endo .......................... 345/173 |
| 6,781,587 | B1 | * | 8/2004  | Grigor ........................ 345/533 |
| 2002/0101439 | A1 | * | 8/2002 | Mamona et al. ........... 345/649 |

* cited by examiner

*Primary Examiner*—Matthew C. Bella
*Assistant Examiner*—Wesner Sajous
(74) *Attorney, Agent, or Firm*—Hamilton, Brook, Smith & Reynolds, P.C.

(57) ABSTRACT

The invention method and system provides rotation of an image on a display screen. A graphics library translates on-screen coordinates from a base viewing mode to a desired alternate viewing mode. The translated coordinated are rendered directly to the display screen.

16 Claims, 11 Drawing Sheets

SCREEN ROTATION

BACKGROUND OF THE INVENTION

Advances in computer technology have produced more compact, less expensive and faster computer devices than ever before. Where computers once occupied entire rooms, they are now compact enough to be portable and fit in one's hand. Examples of such devices are cellular telephones, handheld computers, personal digital assistants (PDA's), and the like.

Display size, resolution and color capability are other aspects that are affected by the compact size of these devices. The display of these devices typically have a correspondingly small elongated rectangular display screen operatively mounted on a surface of the device. While holding the device in its operation and viewing orientation, a user may operate the device using externally mounted buttons on the device housing or touch screen controls on the display. With the device in such operation and viewing orientation the display screen is typically in a vertically elongated orientation (i.e., a "portrait" orientation) as seen by the user.

If the user physically rotates the device ninety degrees, the system must rotate the screen contents ninety degrees in the opposite direction for a correctly oriented image to be displayed to the user. To do this, the typical system maintains an intermediate screen buffer of pixels that must be rotated ninety degrees prior to insertion in the display buffer, thereby providing a portrait mode emulation using a landscape orientation. One disadvantage with this approach is that direct screen writes to the display buffer are not possible, because the physical orientation of the screen does not match the orientation of the display buffer. This results in increased demands on the CPU and memory in a device with limited resources.

Other systems have used various mechanisms to rotate image data in the screen buffer. In one such system, the pixels are rotated one by one and the bits representing the color or gray scale level for an individual pixel in the screen buffer are extracted from the original memory location in the screen buffer and placed into a temporary byte. A memory location in the display buffer in which to place the pixel is then determined. The new location will reflect the ninety degree rotation. The rotated pixel value is written to image data in the display buffer by setting the appropriate bits in the new memory location with the bits from the temporary byte. In another system, a table lookup scheme is used to rotate the screen contents.

SUMMARY OF THE INVENTION

Disadvantages with the prior art systems include the process of each pixel value in the screen buffer being converted to a byte value before it is moved from the internal screen buffer into the proper location in the display buffer. The use of these internal buffers results in increased demand for CPU and power resources in a machine that typically has limited resources.

The present invention overcomes the problems of the prior art by providing a method and system for rotating an image on a display screen which (i) initializes a base mode of the display screen, (ii) chooses one of a plurality of alternate modes for the displaying a subject image, (iii) using a graphics library, translates coordinates from the base mode to the chosen alternate mode, and (iv) using the translated coordinates, renders the image according to the chosen alternate mode directly to the display screen.

The graphics library may include rotation functions, flush functions and event functions. The base mode may be based on a x-y coordinate system and may be mirrored. The alternate modes may be in 90 degree increments of the base mode and may be mirrored. The step of using a graphics library includes providing a respective graphics library for each alternative mode.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
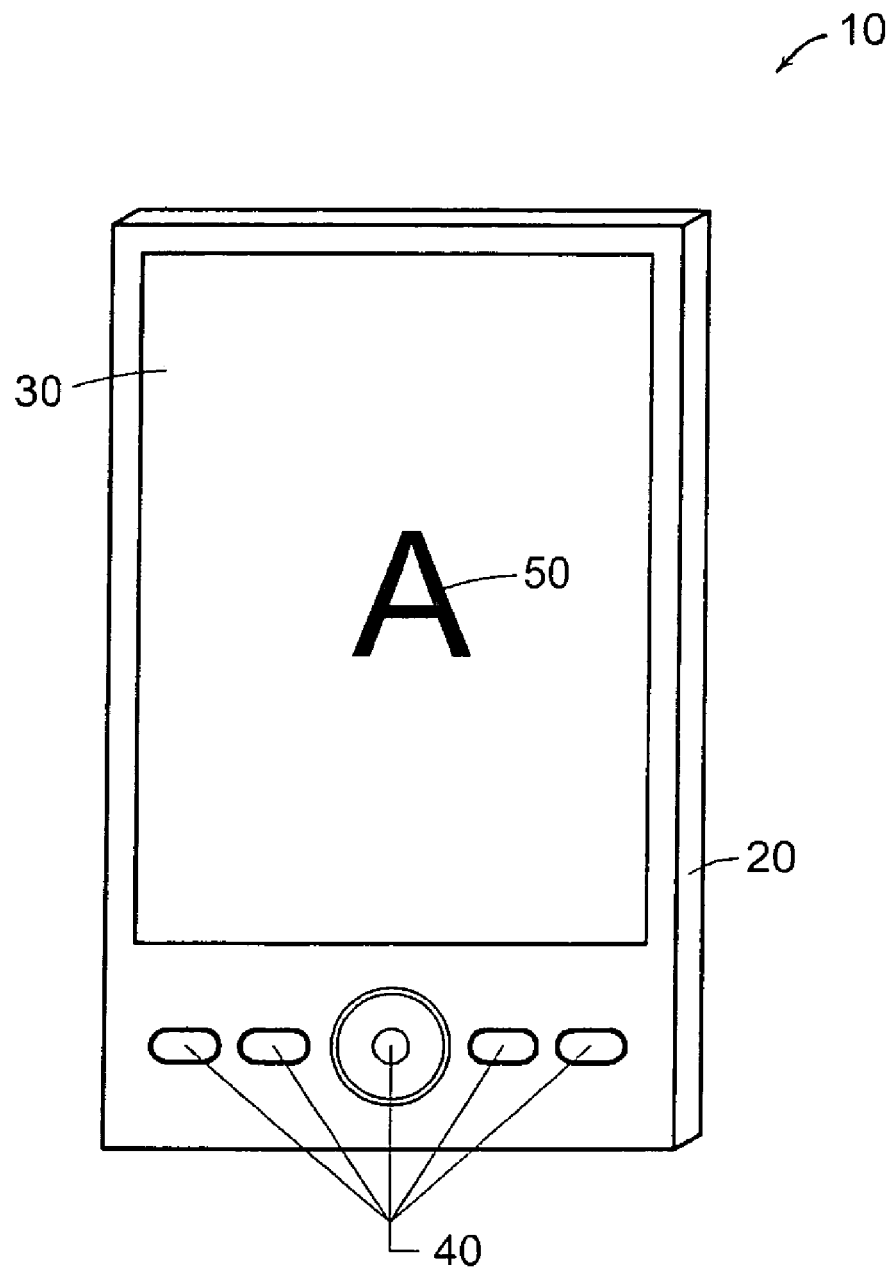
FIG. 1 is a perspective view of a hand-held device.

Generally, as shown in FIG. 1, a handheld electronic device 10 consists of a housing and display screen 30. The device 10 is operated by mechanical buttons or function keys 40 located on the device housing 20. Further, the device 10 may be operable via touch screen keys (not shown) located on the display screen 30. An image 50 is displayed on the display screen 30 for viewing by the device operator.

Those skilled in the art will appreciate that the invention may be practiced with other computer system configurations, including hand-held devices, mobile electronic devices, multiprocessor systems, microprocessor-based or programmable consumer electronics, network PCs, minicomputers, mainframe computers, and the like. Further, the invention may also be practiced in distributed computing environments where tasks are performed by remote processing devices that are linked through a communications network. In a distributed computing environment, program modules may be located in both local and remote memory storage devices.

Figure 10:
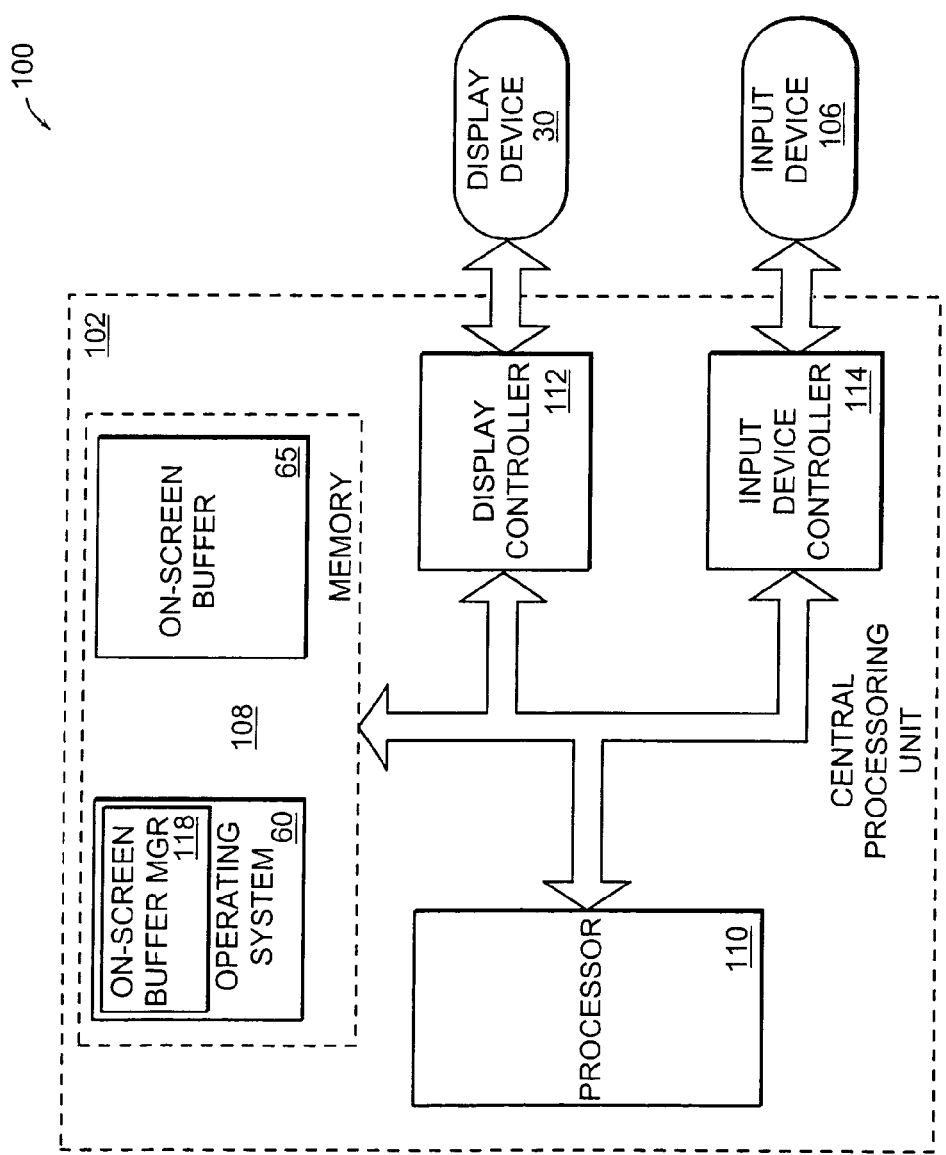
FIG. 10 is a block diagram of a computer system including an on-screen buffer managed by an on-screen buffer manager according to the principles of the present invention.

FIG. 10 is a block diagram of a computer system 100 including an on-screen buffer 65 managed by an on-screen buffer manager 118 according to the principles of the present invention. The computer system 100 includes a central processing unit 102 coupled to a display device 30 and an input device 106. The display device 30 includes a screen for displaying a two-dimensional array of pixels representing the contents of the on-screen buffer 65. The screen can be a flat panel screen, a Cathode Ray Tube (CRT), a Liquid Crystal Display (LCD) or any other type of screen typically used by a display device.

A portion of the memory 108 is reserved for the on-screen buffer 65. The on-screen buffer manager 118 in an operating system 60 in the memory 108 manages updates to the on-screen buffer 65. In the embodiment shown, a portion of the memory 108 is reserved for the on-screen buffer 108. However, in alternate embodiments, the on-screen buffer 65 can be a separate memory.

A processor 110 is coupled to the memory 108, a display controller 112 and an input device controller 114. The display controller 112 coupled to the display device 30 reads the on-screen buffer 65 for display by the display device 30. The processor is also coupled to an input device controller 114 for processing keycodes received from an input device 106 coupled to the input device controller 114. The input device 106 can be a keyboard, keypad, mouse or any other type of input device typically used in a computer system.

In one embodiment the processor 110 is an Intel StrongARM Reduced Instruction Set Computer (RISC) processor which includes data cache and instruction cache. The instruction cache and data cache increases the performance of the computer system 100 by reducing the number of accesses to the memory 108.

Figure 11:
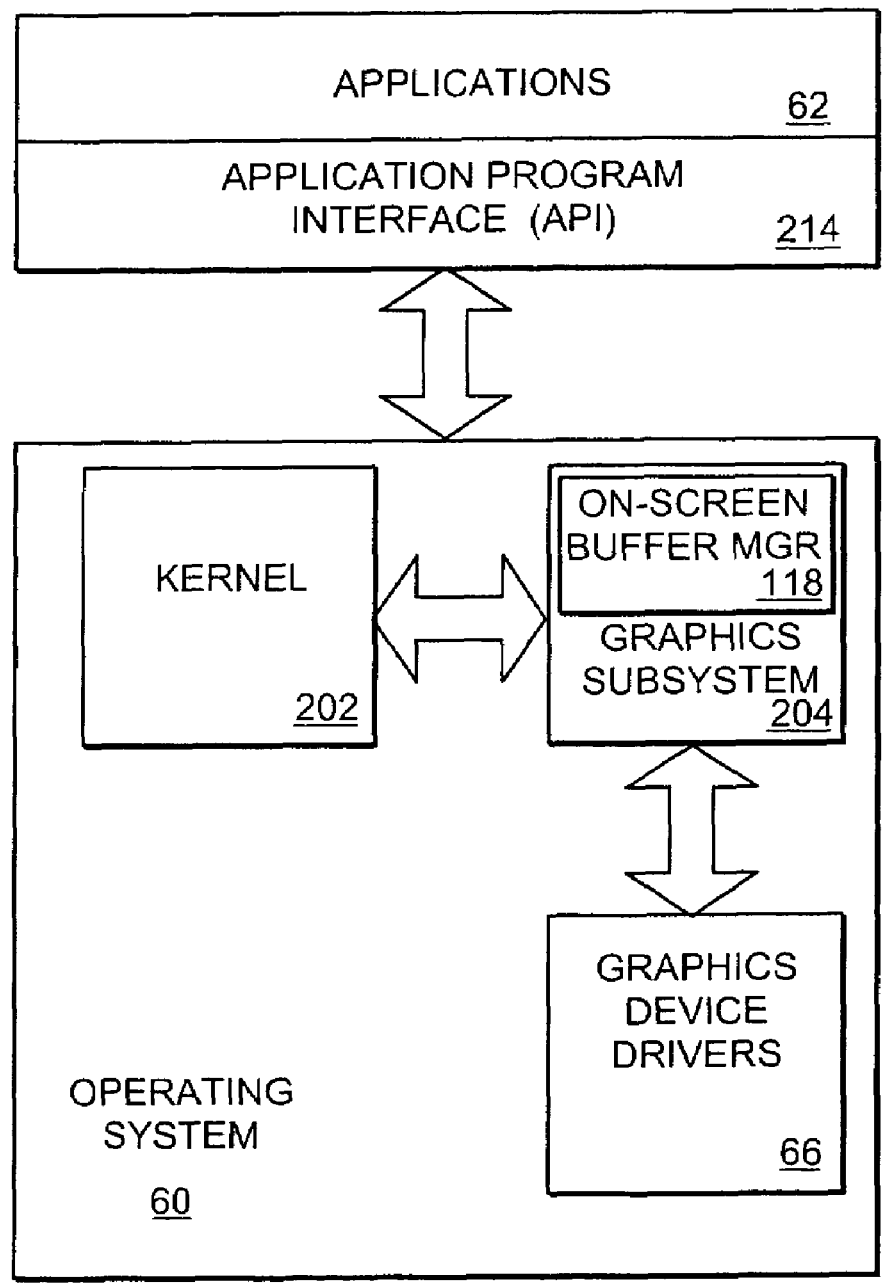
FIG. 11 is a block diagram of an operating system including the on-screen buffer manager in the computer system shown in FIG. 10.

FIG. 11 is a block diagram of the operating system 60 including the on-screen buffer manager 118 shown in FIG. 10. The operating system 60 also includes a kernel 202, graphics subsystem 204 and graphics device drivers 66. An application 62 calls the operating system 60 through an Applications Program Interface (API) 214. The application program can be an object oriented application, for example, a JAVA application.

The type of display device coupled to the computer system 100 is hidden from the application 62 by the operating system 60. Each graphics device driver 66 includes functions to support a particular type of display device 30.

The graphics subsystem 204 includes the on-screen buffer manager 118 for managing the on-screen buffer 65 in memory 108. The on-screen buffer 65 corresponds to the two dimensional co-ordinate system of the screen of the display device 30 and is continuously read by the display controller 112 for display on the screen of the display device 30. All updates to the data displayed on the screen of the display device 30 are performed directly in the on-screen buffer 65 while the on-screen buffer 65 continues to be read for display on the screen. The on-screen buffer manager 118 efficiently updates the on-screen buffer 65 using invention graphics library 64 as described later below.

Figure 2:
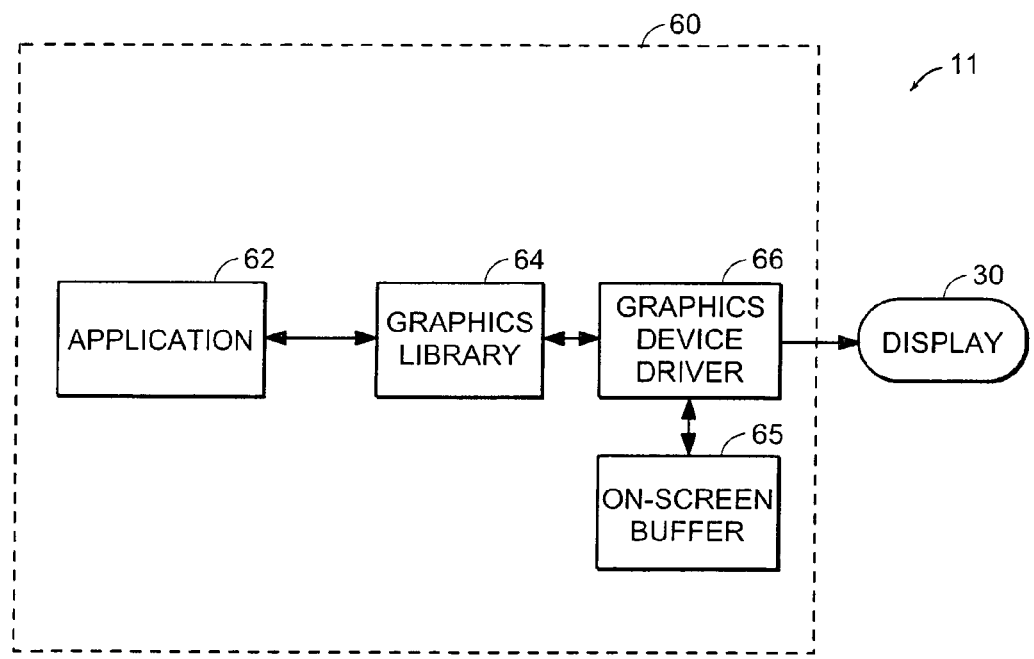
FIG. 2 is a diagram showing the major components of a software system embodying the invention.

FIG. 2 presents a system level overview of an embodiment of the present invention. Included in the system 11 are operating system 60, application 62, graphics library 64, screen buffer 65, device driver 66, and display screen 30. Operating system 60 comprises a set of software modules designed to control and manage the resources of the computer system 11.

Application 62 is a software application running under operating system 60 which, as one aspect of its operation, provides output to be displayed on display screen 30. Examples of applications include word processors, spreadsheet calculators, personal information managers, and e-mail programs. Other applications 62 are suitable.

The graphics library 64 is a library of functions that is typically provided by or with operating system 60 that provide for the displaying of graphical objects on a display screen (or monitor). The functions implemented by graphics library 64 include functions that display objects such as polygons, lines, circle, blit, and text. The graphics library 64 also includes functions that control the attributes of the graphical objects such as size, color, texture, position, and orientation.

An optional off-screen buffer (not shown) allows third party code to be correctly translated by operating system 60. Once the third party code is translated it can be rendered to the correct display screen 30 coordinates.

The graphics device driver 66 is a software module known in the art generally as a device driver. The graphics device driver 66 comprises software routines that interface with a hardware controller (not shown) that controls display screen 30. The software routines in graphics display driver 66 are typically written for a particular type of hardware controller and display screen 30. This is because different hardware manufacturers define different interfaces for their hardware, which results in specialized software requirements.

A display screen 30 is a hardware component that shows the output produced by application 62 as rendered through the graphics device driver 66. The display screen 30 is configurable to operate as different display types, display resolutions, and pixel bit widths.

Figure 3:
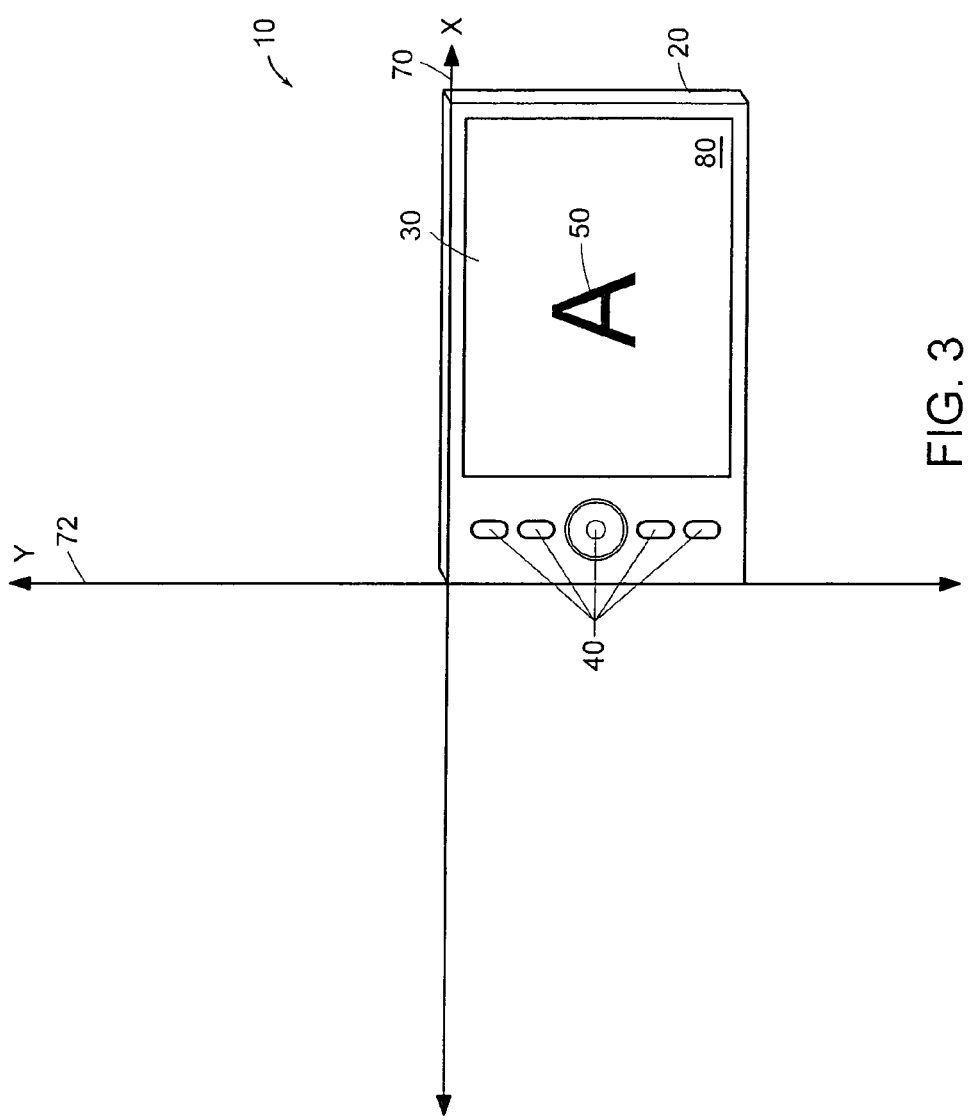
FIG. 3 is a perspective view of the landscape mode of the invention.

FIGS. 3–6, show various device 10 and display screen 30 rotations. FIG. 3 shows a representation of image 50 for a landscape mode 80. Pixel values for landscape mode 80 are located by specifying coordinates along X axis 70 and Y axis 72. In this example, landscape mode 80 is the systems 11 base mode, that is all other display modes are defined relative to the base mode. Thus, screen 30 and corresponding image 50 have the illustrated orientation when graphics data is output from an application 62 and the default graphics library 64 and graphics device driver 66 operations are applied to the data and the resulting data is rendered to the display screen 30.

Figure 4:
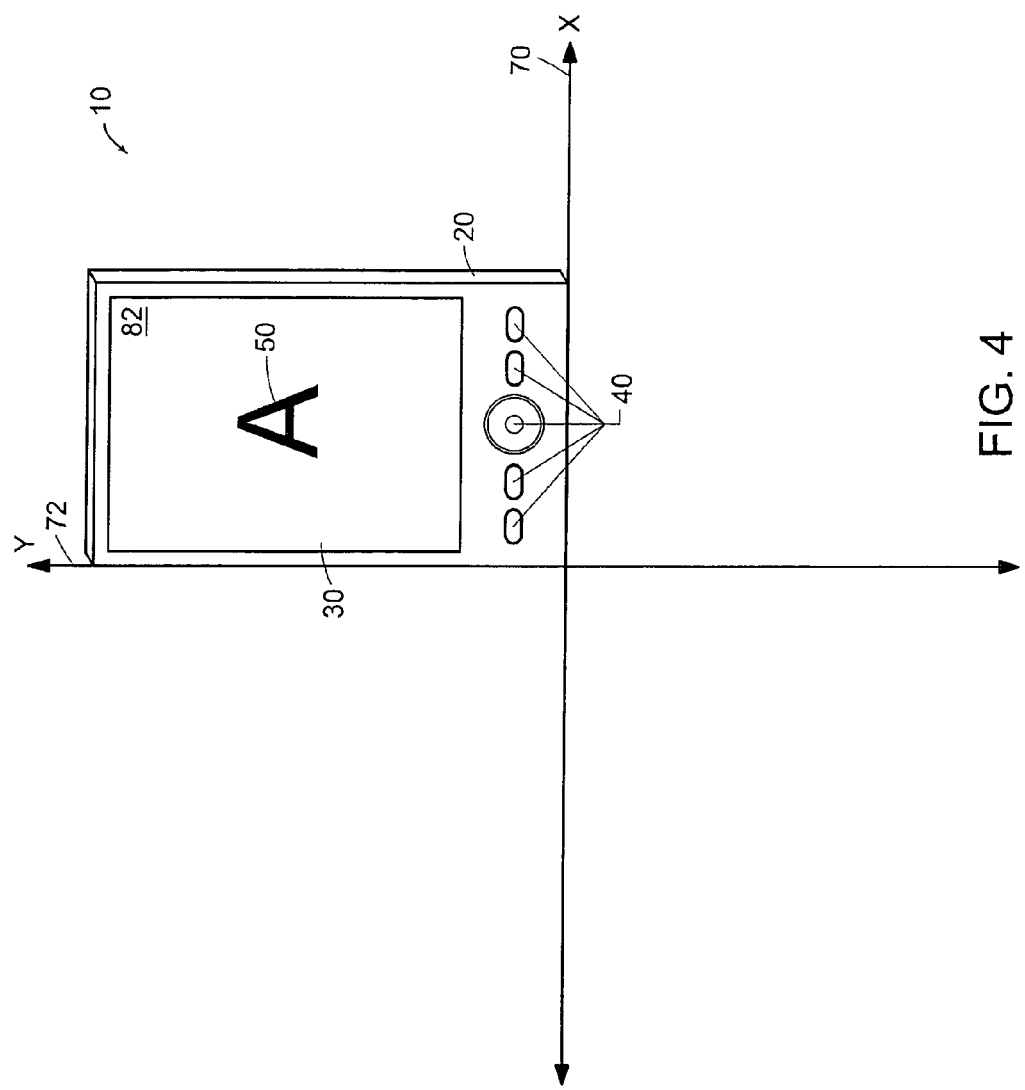
FIG. 4 is a perspective view of the portrait mode of the invention.

FIG. 4 shows a representation of screen 30 and image 50 after it has been rotated according to the invention method described below. Portrait mode 82 is a graphical representation of landscape mode 80 that has been physically rotated ninety degrees. Like landscape mode 80, pixels in screen 30 are located by specifying X values along X axis 70 and Y values along Y axis 72. Here, image 50 is the result of rotating the image data, that resulted from the default operations of base mode 80 shown in FIG. 3, ninety degrees and writing the rotated image data directly to the screen 30.

Figure 5:
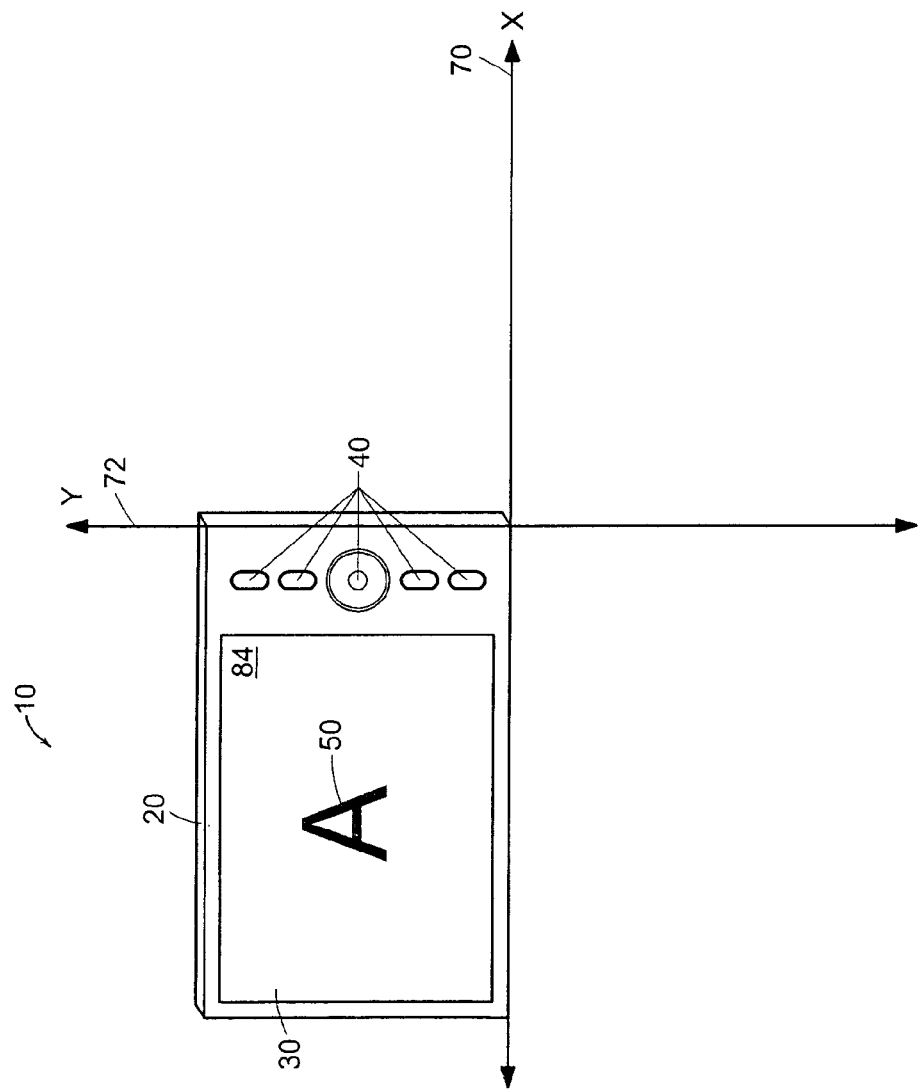
FIG. 5 is a perspective view of the reverse landscape mode of the invention.

FIG. 5 shows a reverse landscape mode 84, which is a graphical representation of landscape mode 80 that has been physically rotated 180 degrees. Like landscape mode 80, pixels in screen 30 are located by specifying X values along X axis 70 and Y values along Y axis 72. Here, image 50 is the result of rotating the image data, that resulted from the default operations of base mode 80 shown in FIG. 3, 180 degrees and writing the rotated image data directly to the screen 30.

Figure 6:
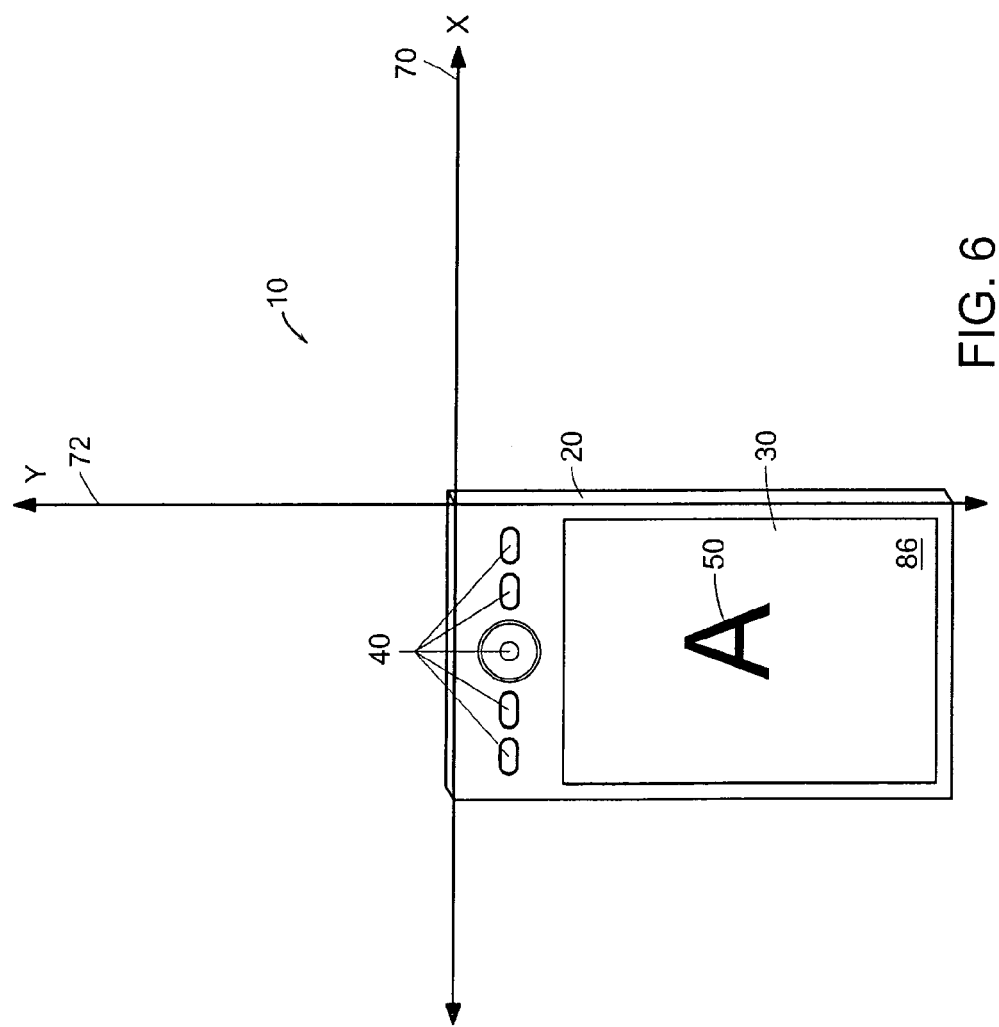
FIG. 6 is a perspective view of the reverse portrait mode of the invention.

FIG. 6 shows a reverse portrait mode 86, which is a graphical representation of landscape mode 80 that has been physically rotated 270 degrees. Like landscape mode 80, pixels in screen 30 are located by specifying X values along X axis 70 and Y values along Y axis 72. Here, image 50 is the result of rotating the image data, that resulted from the default operations of base mode 80 shown in FIG. 3, 270 degrees and writing the rotated image data directly to the screen 30.

It should be understood by one skilled in the art that any mode maybe defined as the base mode. Further, each mode also has a mirror image mode and each mode can be defined by any coordinate system, e.g., point of origin of the coordinate system may be located at any place on the screen.

Figure 7:
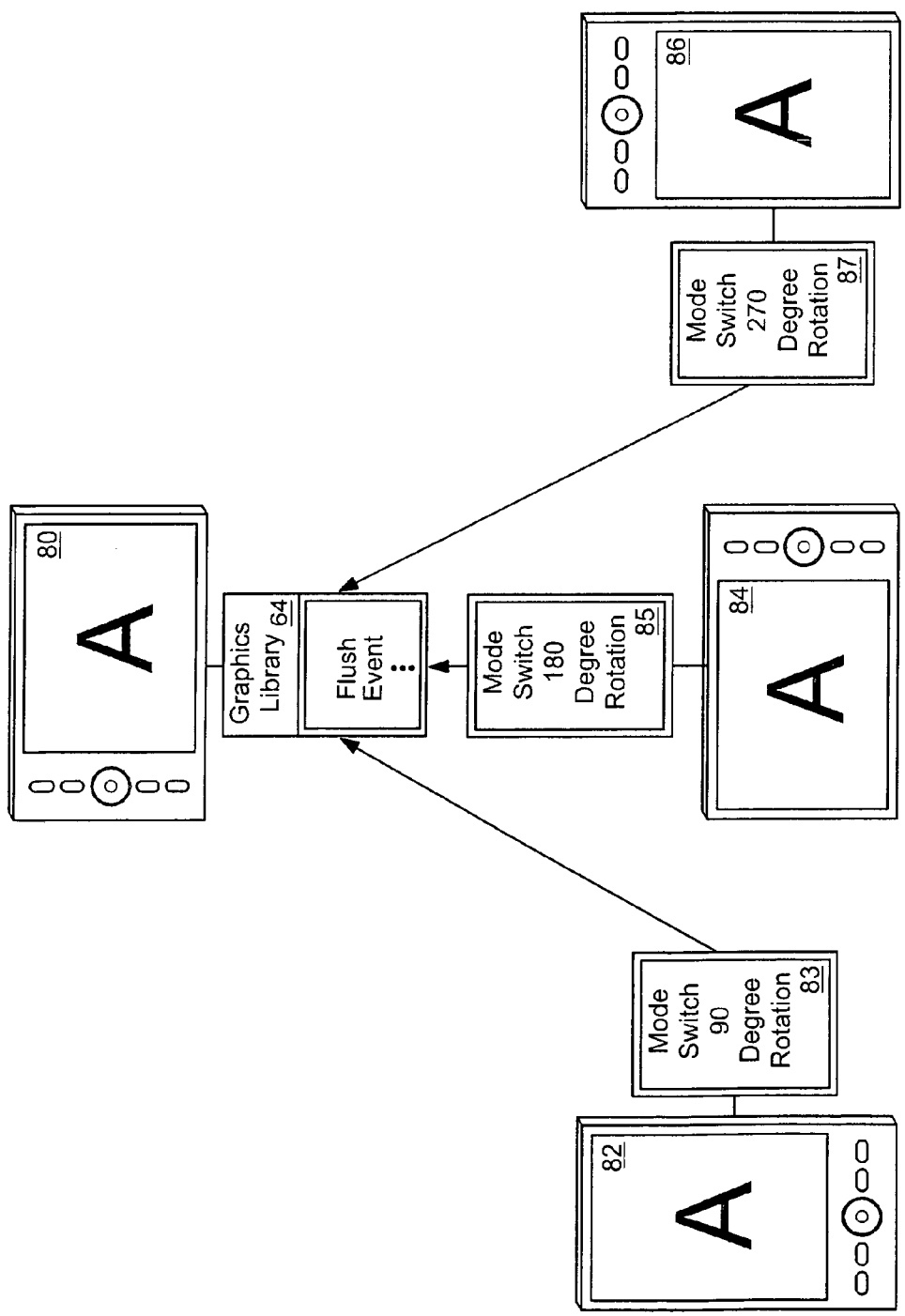
FIG. 7 is an illustration of operation of one embodiment of the invention.

In one embodiment as shown in FIG. 7, the graphics library 64 has code for generating image data initially in the landscape mode or base viewing mode 80. All other modes or alternate viewing modes 82, 84, and 86 reference the base viewing mode 80 and then translate on the fly the screen coordinates for its particular mode. To accomplish this, there is a standard set of normal and rotate functions 83, 85, 87 built into the graphics library 64. Known techniques for translating a pixel location in one orientation to a certain (e.g., 90 degree increments) rotated orientation are used. Each of these rotate function 83, 85, 87 operate relative to the base viewing mode 80. Preferably there is a respective rotate function 83, 85, 87 for each desired alternative mode 82, 84, 86. Further, these rotate functions 83, 85, 87 are built for 8 bit, 16 bit, 24 bit, and 32 bit graphic modes. It should be understood that these rotate functions can be made for other bit size graphic modes.

Figure 8:
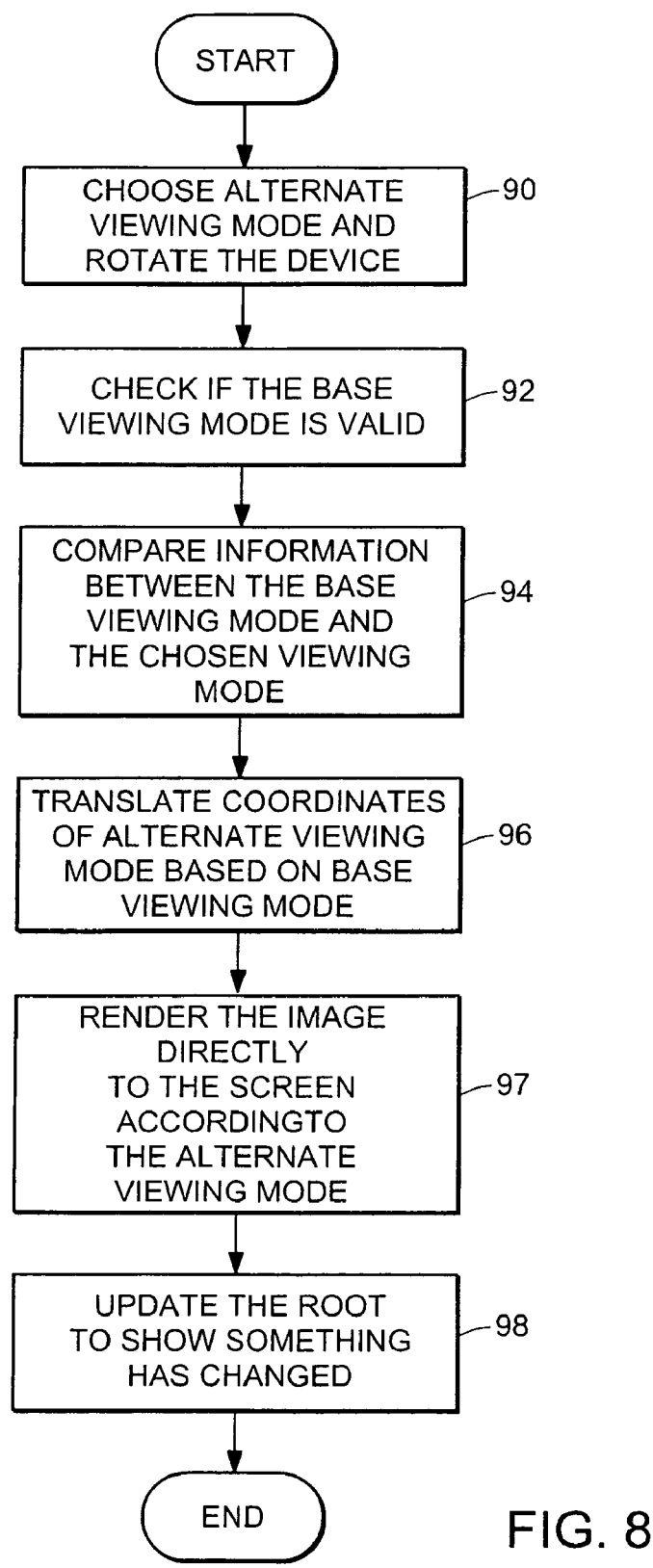
FIG. 8 is a flow chart outlining the steps of the invention shown in FIG. 7.

The method for preforming screen rotation for the FIG. 7 embodiment is shown in FIG. 8. In first step 90, a user or application selects the alternative viewing mode 82, 84, 86 and rotates the device in the mode selected. Next, in step 92, the system 11 checks the base viewing mode 80 for validity. Normally, the base viewing mode 80 is valid for simple screen rotations. However, when the video mode changes (for example, 640×480 to 800×600) the base mode 80 is invalid until a low level hardware setup of the video mode is accomplished. The low level hardware setup is preformed by techniques known in the art.

Once the base mode 80 is validated, the system 11 in step 94 compares geometric orientation and screen pixel location information from the base mode 80 to the chosen alternative mode 82, 84, 86. The system 11 selects and fills function parameters according to the chosen alternative mode 82, 84, 86. Special functions such as flush functions and event functions are explained below.

In step 96, the selected and set function translates pixel coordinates from base mode 80 to the new mode. The on-screen buffer manager 118 timely places the resulting image data (translated pixel coordinates) into the on-screen buffer 65. In step 97, the graphics device driver 66 uses the resulting image data (rotated image) stored in on-screen buffer 65 to render or redraw the image 50 directly to the display screen 30.

Next (step 98), a timer s(part of the on-screen buffer manager 118) synchronizes the graphics library 64 and graphics device driver 66 to indicate that an update or change in system 11 has occurred. The global time is then updated. Once the global time is updated all library functions check themselves to see if they are still valid.

Special device drivers may need to be called for certain functions. These functions include flush, event and like functions. These functions occur when certain parts of the display screen 30 change due to its associated function. These functions are contained in the graphics library 64 of the base viewing mode. A flush function is the process of sending through the system all remaining buffered data generated by the application.

Event functions are processed as data input to the system 11. An event may occur on a touch screen where a certain x-y coordinate location is touched. An input device controller 114 generates responsive signals for the touch screen event and translates the screen coordinates corresponding to the event based on the base mode 80 as defined in the graphics library 64.

Figure 9:
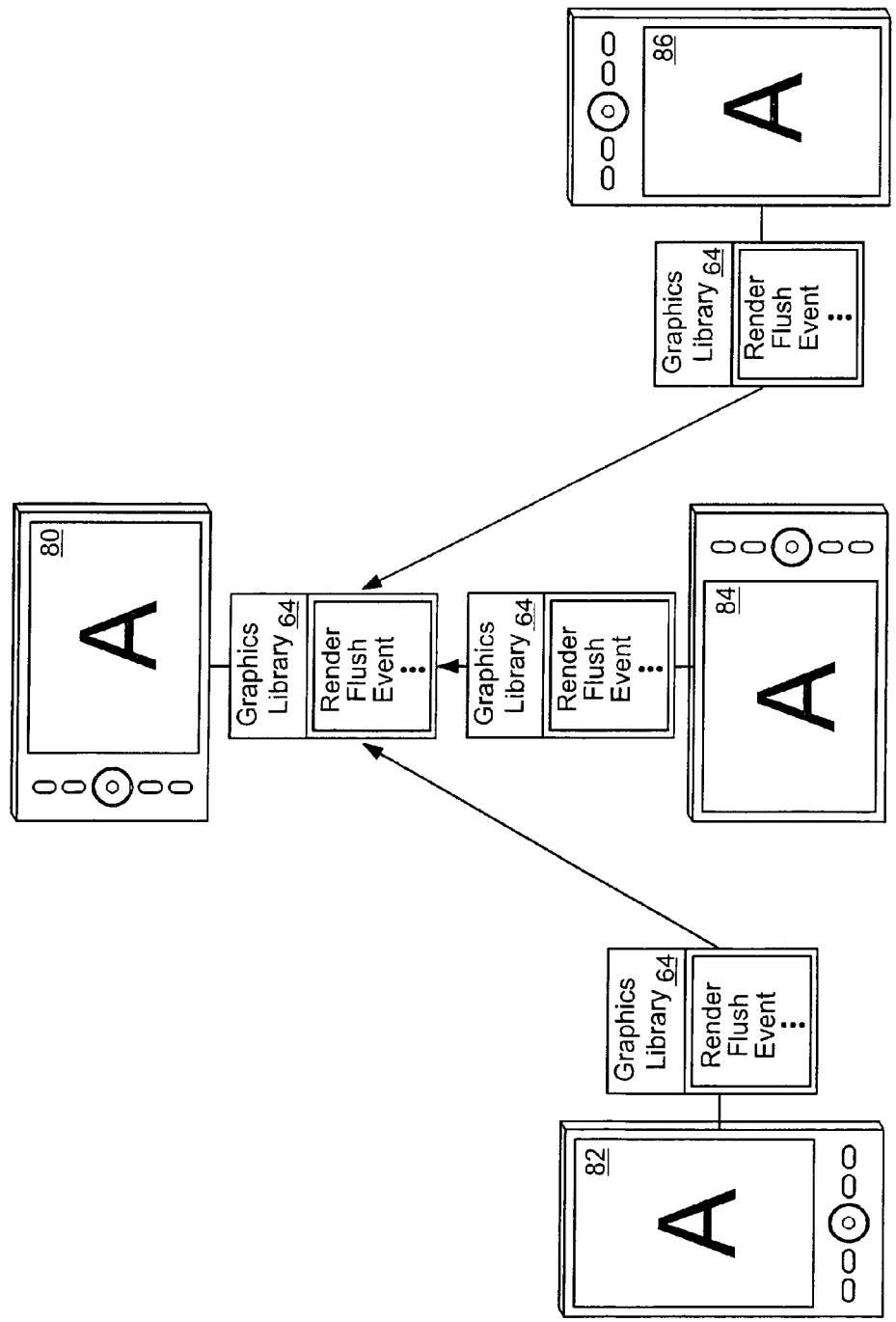
FIG. 9 is an illustration of operation of another embodiment of the invention.

In another embodiment of the invention as shown in FIG. 9, each of the portrait mode 82, reverse landscape mode 82, and reverse portrait mode 86 (alternate viewing modes) are based relative to the landscape mode (base viewing mode) 80. However, unlike the embodiment of FIG. 7, each mode 80, 82, 84, and 86 has a respective associated graphics library 64 which contains the functions used to draw the image 50 directly to the display screen 30 in the corresponding orientation. Each set of functions is pregenerated through the systems composite code for the associated viewing mode 80, 82, 84, 86. For a given mode 80, 82, 84, 86, its given graphics library 64 contains the code needed to draw a subject image 50 directly to the display screen 30 according to the orientation/rotation defined by that mode. The on-screen buffer manager 118, on-screen buffer 65, and graphics driver 66 operate as described in the FIG. 7 embodiment.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of rotating an image on a display screen comprising:
    initializing a base mode of the display screen;
    choosing one of a plurality of alternate modes for displaying a subject image;
    using rotation functions of a graphics library, translating in a display memory on-screen coordinates from the base mode to the chosen alternate mode, the translating being in real time; and
    using the translated coordinates, employing at least object drawing functions of the graphics library, rendering the image according to the chosen alternate mode, said rendering being directly to the display screen from the display memory, wherein only the display memory is used for the functions of the graphics library.

2. The method of claim 1, wherein the graphics library includes flush functions and event functions.

3. The method of claim 1, wherein the base mode is based on a x-y coordinate system.

4. The method of claim 1, wherein the base mode is mirrored.

5. The method of claim 1, wherein the alternate modes are in 90 degrees increments of the base mode.

6. The method of claim 5, wherein the alternate modes are mirrored.

7. The method of claim 1, wherein the step of using a graphics library includes providing a respective graphics library for each alternative mode.

8. The method of claim 1 further includes an off screen buffer for translating third party code.

9. A computer system for rotating an image on a display screen comprising:
    an initialization module for initializing a base mode of the display screen;

a switching mechanism for choosing one of a plurality of alternate modes for displaying a subject image;

a translation module for using rotations functions of a graphics library for translating in a display memory on-screen coordinates from the base mode to the chosen alternate mode, the translating being in real time; and a rendering module for using the translated coordinates, employing at least object drawing functions of the graphics library for rendering the image according to the chosen alternate mode, said rendering being directly to the display screen from the display memory, wherein only the display memory is used for the functions of the graphics library.

10. The computer system of claim 8, wherein the graphics library includes flush functions and event functions.

11. The computer system of claim 9, wherein the base mode is based on a x-y coordinate system.

12. The computer system of claim 9, wherein the base mode is mirrored.

13. The computer system of claim 9, wherein the alternate modes are in 90 degrees increments of the base mode.

14. The computer system of claim 13, wherein the alternate modes are mirrored.

15. The computer system of claim 9, wherein the step of using a graphics library includes providing a respective graphics library for each alternative mode.

16. The computer system of claim 9 further includes an off screen buffer module for translating third party code.

* * * * *